Dec. 25, 1928.   
E. W. SMITH   
1,696,652

EJECTOR FOR MOLDS

Filed July 29, 1926

WITNESS:
Rob't R Kitchel.

INVENTOR
Edward W. Smith
BY
Augustus B. Stoughton
ATTORNEY.

Patented Dec. 25, 1928.

1,696,652

UNITED STATES PATENT OFFICE.

EDWARD W. SMITH, OF PHILADELPHIA, PENNSYLVANIA.

EJECTOR FOR MOLDS.

Application filed July 29, 1926. Serial No. 125,815.

The principal object of the present invention is to provide for automatically ejecting balls, or other shapes as of lead, from two-part hinged molds when the latter are opened as by dropping the lower part in respect to the upper part.

Generally stated, the invention comprises ejecting means for two-part hinged molds comprising spurs projecting into the mold cavity and arranged on opposite sides of the parting.

The invention also comprises the improvements to be presently described and finally claimed.

In the following description reference will be made to the accompanying drawing forming part hereof and in which—

Figure 1:
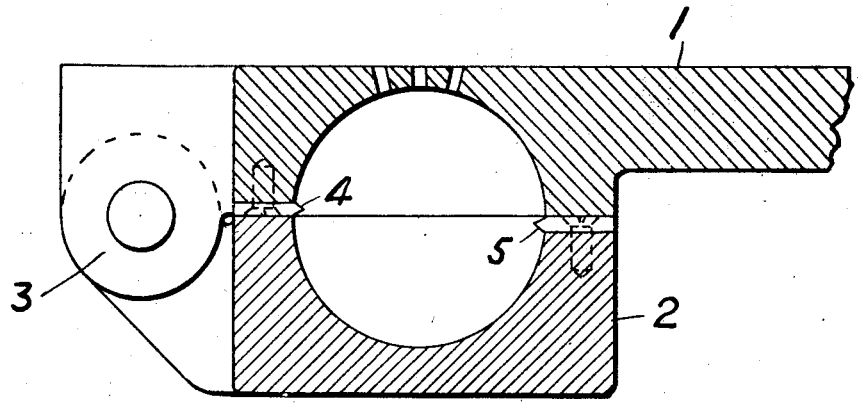

Figure 1 is a sectional view of a two-part hinged ball mold embodying features of the invention and showing the same in closed position with its mold cavity empty, and Figure 1 is a similar view showing the mold partly open and illustrating the operation of the ejecting means.

In the drawing 1 and 2 are the parts of a ball mold and they are hinged together as at 3. 4 and 5 are spurs projecting into the mold cavity and arranged on opposite sides of the parting line.

Figure 2:
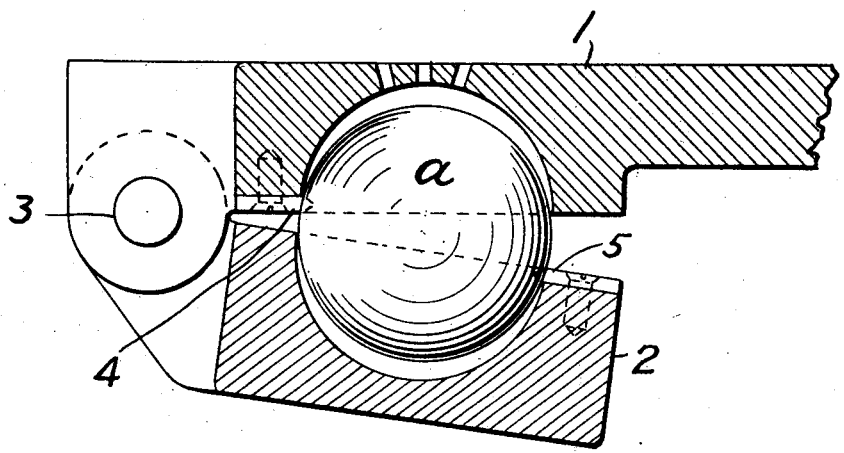

In describing the mode of operation the part 1 may be regarded as fixed, and the part 2 as arranged to be dropped from the part 1 by a turning movement about the hinge 3 in order to open the mold. As the part 2 is dropped, Figure 2, the spurs 4 and 5 which engage the ball $a$, cast in the mold, turn the ball $a$ in respect to them so that it is rolled or dropped.

It will be obvious to those skilled in the art to which the invention relates that modifications may be made in details of construction, arrangement and matters of mere form without departing from the spirit of the invention which is not limited to such matters or otherwise than the prior art and the appended claims may require.

I claim:

1. Ejecting means for two-part hinged molds comprising spurs projecting into the mold cavity and arranged on opposite sides of the parting.

2. Ejecting means for two-part molds comprising spurs fixed in respect to the parts of the mold and projecting into the mold cavity in a direction approximately parallel with the parting and adjacent thereto.

3. Ejecting means for two-part molds comprising spurs fixed in respect to the parts of the mold and projecting into the mold cavity.

4. Ejecting means for two-part molds comprising two spurs fixed in respect to the parts of the mold and projecting into the mold cavity adjacent the parting and whereof one spur is located on one part of the mold and the other spur is located on the other part of the mold and on the opposite side of the cavity from the first spur.

EDWARD W. SMITH.